March 30, 1943.   O. SCHARPF   2,314,952
REGULATING APPARATUS
Original Filed Aug. 30, 1939
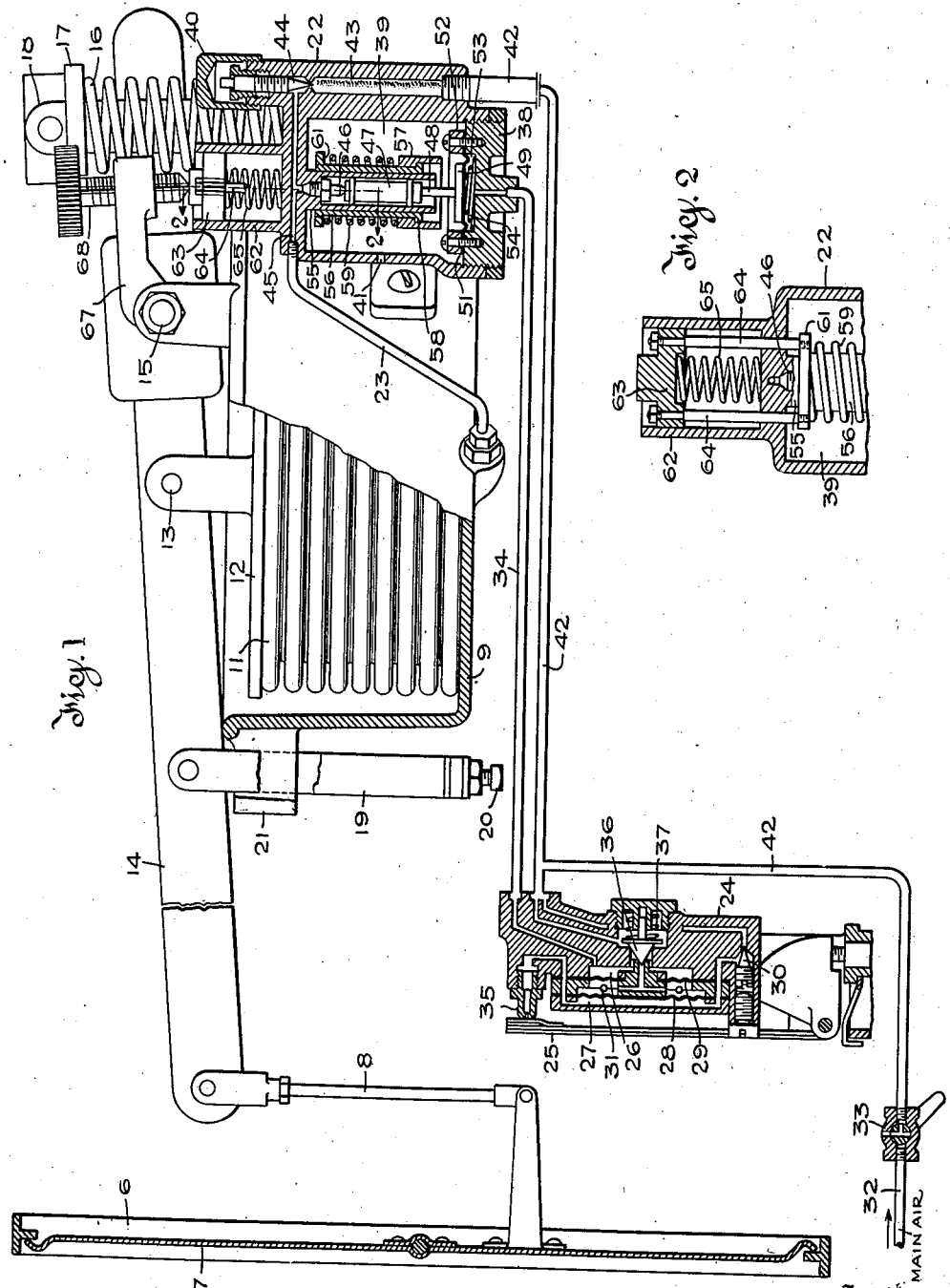
Inventor
Otto Scharpf
By
Dodge и́ll Jm.
Attorneys Patented Mar. 30, 1943

2,314,952

UNITED STATES PATENT OFFICE 2,314,952

REGULATING APPARATUS

Otto Scharpf, Milwaukee, Wis., assignor to Johnson Service Company, Milwaukee, Wis., a corporation of Wisconsin Original application August 30, 1939, Serial No. 292,739. Divided and this application October 6, 1941, Serial No. 413,890

4 Claims. (Cl. 236—82)

This invention relates to regulating systems, and particularly to regulating systems of the pneumatic type.

In the usual practice of pneumatic regulation for temperature and humidity control, valve means have been operated, to control the flow of heat exchanging media, by the direct application of branch line pressure to a pressure or diaphragm motor. The branch line pressure serves as pilot pressure to control a throttling valve and this pressure is derived from a main source of pressure usually amounting to approximately fifteen pounds per square inch.

Certain advantages in stability and precision of regulation are accomplished by employing, instead of the direct control above mentioned, a pilot valve including a diaphragm chamber and a pneumatic leak port associated with the pressure motor, the leak port being controlled in response to variations in the quantity under control and affecting the pressure in the diaphragm chamber. One application of such an arrangement as that mentioned, is described and claimed in the copending application of Carl A. Otto, Serial No. 211,648, filed June 3, 1938, Patent No. 2,258,366, dated October 7, 1941. In that application the valve for the control of flow of heat exchanging medium is biased to open position by a spring and this opening tendency is balanced against the action of the regulating means which includes a pilot valve and leak port. The parts are so arranged that the leak port which controls the pressure in the diaphragm motor in response to variations in the quantity or condition to be controlled, is held open to allow the pressure to dissipate from the pressure motor under conditions requiring complete opening of the valve. Under conditions, however, where it is desirable to have the valve biased to closed position, the leak port must be biased to closed position to maintain pressure in the pressure motor, and where it is desirable to establish a minimum opened position of the valve while maintaining the automatic operation between that minimum and full opened position, peculiarly difficult factors of construction and operation are introduced. Usually such operation requires the use of auxiliary lines and valves which the present invention eliminates.

One condition, for example, which is frequently met in practice, is that where a fresh air damper operated by a pneumatic motor in a unit ventilator is to be controlled. With such an arrangement, it is desirable that the damper be closed when the room containing the ventilator is unoccupied. When, however, the room is occupied, the operation of the mechanism should be such as to first open the damper and introduce a minimum amount of fresh air, and then to regulate the damper according to conditions in response to a room thermostat or other responsive instrument. This control should be effective between minimum open position, and wide open position, in order to produce and maintain a constant room temperature.

One form of motor capable of performing this function is disclosed and claimed in the patent to Otto No. 1,961,526, dated June 5, 1934. That patent, however, involves the direct control of the damper motor in response to branch line pressure variations, and hence does not lend itself to applications where a pilot valve responsive to variations in branch line pressure is employed to control the damper motor.

Accordingly, the present invention is concerned with the adaptation of the mechanism shown in Patent No. 2,258,366, to accomplish new and improved results. Particularly it involves adaptations of a pilot valve control making it possible to establish a minimum position of a damper or equivalent device by means forming a part of the pilot valve assembly, while leaving the apparatus automatically responsive to the quantity or condition under control to regulate further opening of the damper in accordance with variations in that quantity or condition.

In the drawing:

Figure 1 is a diagrammatic view of a system including one embodiment of the present invention and disposed to operate a damper through a normally closed leak port arrangement, parts of the apparatus being shown in section; and Fig. 2 is a partial sectional view on line 2—2 of Fig. 1.

In Fig. 1, a damper frame 6 supports a pivoted damper 7, which serves to control the flow of some heat exchanging medium, ordinarily fresh air, in response to variations of some atmospheric condition, commonly temperature. The damper 7 is operated through a link 8 by a damper motor 9 comprising bellows 11 which react through a head 12 upon a lever 14 which is pivoted at 15 to the frame of the motor and at 13 to the head 12. A spring 16 reacts between the frame of the motor and a spring seat 17 which is secured to the lever 14 by a clip 18. The spring 16 acts to urge the lever toward damper closing position.

The opening movement of the damper is limited by an adjustable stop screw 20 mounted in a stirrup 19 which is attached to the lever. The stop screw coacts with a lug 21 on the motor frame.

Air from any suitable source is supplied through a main 32 at an appropriate pressure, say, 15-lbs. gauge. A valve 33 connects the main 32 with a system supply line 42, or, in its other position, disconnects the line 42 and vents the system.

The valve 33 is an ordinary manually operable three-way valve, as shown. One branch of the line 42 leads to a thermostat of the relay type, generally indicated at 24 and shown as constructed according to the patent to Otto, No. 1,500,260. Air from this branch is supplied to the inlet seat of a combined inlet and exhaust valve 36 which is urged in a seating direction by a coil compression spring 37. A pair of flexible diaphragms of slightly different area, 28 and 29, are connected by a hub in which the exhaust port of the relay is formed. This exhaust port leads to the space between the diaphragms which is vented to atmosphere at 31. At the rear of the diaphragm 29 is the controlled space 26 which is connected to the branch line 34 and to and from which the valve 36 functions to admit and exhaust air. The controlling chamber 27 is at the front of the diaphragm and from this chamber 27 there leads a leak-port 35 which is controlled by the thermostatic bar valve 25. The supply line 42 feeds air to the controlling chamber 27 at a restricted rate through the needle valve 30. Leak-port 35, when fully open has a capacity greater than that of the needle valve 30.

As fully explained in the patent above-identified, the variable throttling of the leak-port establishes variable pressure in chamber 27. The relay functions to establish related pressure in the chamber 26 and consequently in the branch line 34.

Mounted on the damper motor is a housing 22 which encloses the controlling valve mechanism for the damper motor. This valve mechanism responds to the varying pressure in the branch line 34, just mentioned. The housing 22 encloses a chamber 39 which is vented to atmosphere at 41. The line 42 delivers air through a filter 43 housed in a chamber in the body 22 and thence through a flow-restricting needle valve 44 to a passage 45, which passage is connected by pipe 23 with the interior of the bellows motor 11.

A leak-port 46, which is variably throttled and which, when open, has a capacity greater than the flow past the needle valve 44, controls the pressure in the pipe 23, and consequently in bellows 11. The leak-port 46 is controlled by a valve member 47 which responds to the combined effect of the position of lever 14 and the pressure in the branch line 34. The lower end of the chamber 39 is closed by a screw plug 38 which has a chamber formed in its upper side. Over this chamber a diaphragm 51 is sealed by a ring 52. The branch line 34 is connected to the space below the diaphragm and a light spring 54 biases the diaphragm in an upward direction sufficiently to close valve 47 against the leak-port 46 very lightly in the absence of any pressure in the branch line 34, assuming, of course, that the diaphragm 51 is not loaded in a downward direction by any other means.

Surrounding the leak-port 46 is a tubular guide stem 55 within which the valve member 47 is guided. This valve member has a stem 48 terminating in a thrust disc 49 which rests on top of diaphragm 51, the parts 48 and 49 producing the necessary operative connection between the diaphragm and the leak-port controlling valve 47.

Sliding on the outer side of the guide member 55 is a sleeve 56 which has a flange 58 at its lower end and which has a spring seat 61 threaded upon its upper end. Slidable on the sleeve 56 and limited in its downward motion relatively thereto by flange 58 is a thimble 57 which is urged downwardly relatively to the sleeve 56 by a coil compression spring 59. If the sleeve 56 be forced downwardly, the thimble 57 will engage the thrust disc 49 and thus urge the diaphragm 51 downwardly. Under these conditions, the load is limited by the stress on the coil compression spring 59.

The sleeve 56 is connected (see Fig. 2) by two thrust pins 64 with a plunger 63. This is guided in an upward tubular extension 62, on housing 22. A very light compression spring 65 reacts upon the plunger 63 to bias it in an upward direction and thus draw the sleeve 56 to its uppermost position. The spring can be omitted, but it is desirable to include it because it keeps the plunger 63 in contact with a thrust screw 68 which forms the operative connection between the plunger 63 and the lever 14.

Thrust screw 68 is threaded in a bracket or arm 67 projecting from the lever 14 and at the right of the fulcrum 15. Consequently, when the lever 14 moves in a damper-opening direction, the screw 68 reacts against the plunger 63 and forces it and also the sleeve 56 downward. Screw 68 determines the position of the sleeve 56 for any given position of the lever 14.

*Operation*

The device shown in Figure 1 operates as follows: When the system is out of operation, the valve 33 is set to cut off the supply from main 32 and vent the pipe 42 to atmosphere. Consequently, irrespective of the position of the thermostatic valve 25, the line 34 will be at atmospheric pressure, and so will the pipe 23 and bellows 11. Under these conditions, the spring 54 reacting on the diaphragm 51 biases it upward with sufficient force to cause valve 47 to close leak-port 46. Spring 16 will swing lever 14 until the damper closes.

When the system is put into operation by turning the valve 33 to supply air under pressure to line 42, the thermostat 25 may or may not put the line 34 under pressure, depending on the temperature. At the time development of pressure in the line 42 commences, the valve 47 will be closing the leak-port 46 and it will retain it closed until the damper motor moves in response to rising pressure far enough to cause the thimble 57 to engage and react slightly downward on the thrust disc 49. A balanced condition will be established in which the venting through the leak-pork 46 limits the pressure in the bellows 11 sufficiently to produce equilibrium.

From then on, as pressure in the branch line 34 rises, the effect will be to throttle the leak-port 46 slightly with consequent increase of pressure in the bellows 11. The resulting movement of the lever 14 in the damper will slightly increase the stress on the spring 59 and the parts will assume another balanced position with the damper slightly wider open.

It follows, from the structure shown in Figure 1, that when the system is vented, the damper 7 closes, and when the system is put under pressure, regardless of the temperature affecting the thermostat 25, the damper will be partially open. If the thermostat 25 is not then establishing pressure in the branch line 34, the damper will open to a minimum position. As pressure is gradually raised, in the line 34, the damper will open further from its minimum open position to its wide open position. As stated, the minimum open position is adjusted by changing the relationship between the position of the lever 14 and the sleeve 56 by adjustment of the screw 68.

The only function of the spring 65 is to maintain engagement as above described, but the spring can be omitted, in which case a slight compensatory adjustment would be necessary since the spring 65 does, to a limited extent, oppose motion of the lever 14. It is considered better to use the spring because the weight of the sleeve 56 and connected parts is not then imposed upon the diaphragm 51.

The operative cycle of this arrangement is such that the fresh air damper is moved to its minimum open position whenever air is supplied to the system, and irrespective of the room temperature. The interacting graduating means which controls the motor 11 is internal to the device so that the mechanism can be controlled from a relatively remote relay thermostat such as that indicated at 24, without any special secondary connections. Another valuable point is that the minimum damper setting is readily adjustable by turning the screw 68.

While a typical embodiment of the invention has been described in considerable detail, modifications within the scope of the invention are obviously possible. It follows that the illustrated embodiment, while preferred, is illustrative and not limiting.

This application is a division of my prior application Serial No. 292,739, filed August 30, 1939.

What is claimed is:

1. In combination a damper for controlling the flow of air; a pressure motor for operating said damper; a source of fluid pressure for actuating said motor to operate said damper; means responsive to variations in an atmospheric condition for establishing a secondary fluid pressure which varies as said condition varies; means forming a pressure fluid supply port and a pressure fluid discharge port, one of said ports having a fixed flow capacity; a leak valve movable toward and away from the other of said ports for controlling the pressure in said motor; movable abutment means for controlling said leak valve in response to variations of said secondary fluid pressure; means for biasing said leak valve in a direction to cause opening of said damper irrespective of the value of said secondary pressure; and lost motion spring means associated with said motor and operated by movement thereof to load said leak valve through a portion only of the range of motion of said motor, such loading being in a direction to cause closing of said damper.

2. In combination a damper for controlling the flow of air; a pressure motor for operating said damper; a source of compressed air; means forming a pressure fluid supply port and a pressure fluid discharge port, one of said ports having a fixed flow capacity; a leak valve movable toward and away from the other of said ports for controlling the pressure in said motor; a movable abutment for operating said leak valve; means responsive to an atmospheric condition for controlling the pressure applied to said abutment; yielding means movable with said motor for reacting on said abutment in a direction opposed to the pressure controlled by said atmospheric condition responsive means, but capable of movement through a restricted range without affecting said abutment; and loading means continuously reacting on said abutment in the direction of said controlled pressure.

3. In combination a damper for controlling the flow of air; a pressure motor for operating said damper; a source of compressed air; means forming a pressure fluid supply port of fixed flow capacity and a pressure fluid discharge port of variable flow capacity therefrom; a leak valve movable toward and away from said discharge port for controlling the pressure in said motor; a movable abutment for operating said leak valve; means responsive to an atmospheric condition for controlling the pressure applied to said abutment; yielding means movable with said motor for reacting on said abutment in a direction opposed to the pressure controlled by said atmospheric condition responsive means, but capable of movement through a restricted range without affecting said abutment; means for varying the extent of said restricted range; a spring for opposing movement of said abutment when said reaction is effective; and a loading means continuously reacting on said abutment in the direction of said controlled pressure to cause said motor to move said damper to a minimum open position when said source of air is connected to said motor.

4. In combination a damper for controlling the supply of air to an enclosure; a fluid pressure motor for controlling said damper; a source of fluid pressure connected to said motor; means forming a pressure fluid supply port of fixed flow capacity and a pressure fluid discharge port of variable flow capacity therefrom; a leak valve movable toward and away from said discharge port for controlling the pressure in said motor; a movable abutment for actuating said leak valve; guide means mounted in substantially coaxial relation to said discharge port for guiding said leak valve; continuously acting means independent of conditions within the enclosure for moving said abutment in a direction to close said leak port and to cause said fluid pressure motor to open said damper to a predetermined minimum position for the supply of fresh air to said enclosure; spring means effective only beyond said minimum position for opposing movement of said abutment with a force which varies with the position of the damper; means responsive to variations in an atmospheric condition within said enclosure for supplementing the action of said continuously acting means in actuating said abutment to control said leak port; and means for varying the point at which said spring means becomes effective to oppose movement of said abutment.

OTTO SCHARPF.